United States Patent [19]

Christianson et al.

[11] Patent Number: 5,251,663
[45] Date of Patent: Oct. 12, 1993

[54] HIGH-TEMPERATURE, HIGH-PRESSURE OXYGEN METERING VALVE

[75] Inventors: Rollin C. Christianson; Peter P. Lycou; James A. Daniel, all of Las Cruces, N. Mex.

[73] Assignee: The United States of America as represented by the Administrator of the National Aeronautics and Space Administration, Washington, D.C.

[21] Appl. No.: 929,552

[22] Filed: Aug. 14, 1992

[51] Int. Cl.⁵ .............................................. F16K 5/04
[52] U.S. Cl. ................................ 137/876; 251/214; 137/625.47
[58] Field of Search ............... 137/625.47, 876, 887; 251/214, 309

[56] References Cited

U.S. PATENT DOCUMENTS

| | | | |
|---|---|---|---|
| 1,807,085 | 5/1931 | Crickmer | 137/625.47 |
| 1,807,900 | 6/1931 | Dougherty | 137/625.47 X |
| 2,011,063 | 8/1985 | Masoner | 158/115 |
| 2,056,902 | 10/1936 | Longenecker | 137/625.47 X |
| 3,384,337 | 5/1968 | Brown | 251/214 X |
| 4,489,916 | 12/1984 | Stevens | 251/214 |
| 4,741,509 | 5/1988 | Bunch et al. | 251/172 |
| 4,742,987 | 5/1988 | Kanamori et al. | 251/123 |
| 4,776,566 | 10/1988 | Girdley | 251/368 |

FOREIGN PATENT DOCUMENTS

| | | | |
|---|---|---|---|
| 2140825 | 2/1973 | Fed. Rep. of Germany | 251/309 |
| 3642872 | 6/1988 | Fed. Rep. of Germany | 251/309 |

Primary Examiner—John C. Fox
Attorney, Agent, or Firm—Russell E. Schlorff; Guy M. Miller; Edward K. Fein

[57] ABSTRACT

A control valves includes a body defining a central cavity arranged between a fluid inlet and outwardly-diverging first and second fluid outlets respectively disposed in a common transverse plane. A valve member is arranged in the cavity for rotation between first and second operating positions where a transverse fluid passage through the valve member alternatively communicates the fluid inlet with one or the other of the fluid outlets. To minimize fluid turbulence when the valve member is rotated to an alternate operating position, the fluid passage has a convergent entrance for maintaining the passage in permanent communication with the fluid inlet as well as an oblong exit opening with spaced side walls for enabling the exit opening to temporarily span the first and second fluid outlets as the valve member is turned between its respective operating positions.

6 Claims, 2 Drawing Sheets

HIGH-TEMPERATURE, HIGH-PRESSURE OXYGEN METERING VALVE

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 U.S. C. 2457).

BACKGROUND OF THE INVENTION

1. Field of the Invention

High-pressure gaseous oxygen is typically utilized as the oxidizer in the bipropellant systems of many spacecraft as well as in various test systems in which gaseous oxygen is flowing. In many of these systems, gaseous oxygen at high pressures is often heated to elevated temperatures of 500-degrees Fahrenheit or more before the oxidizer is introduced at a selected flow rate into the combustion chamber of the spacecraft engine.

The present invention relates to new and improved valves for controlling high-pressure gases such as gaseous oxygen flowing at extreme temperatures as well as for various types of fluid systems where cryogenic fluids and abrasive fluids are flowing. More particularly, the invention is directed to new and improved flow controlling valves cooperatively arranged to be moved between operating positions without creating objectionable backpressure surges in the flow system upstream of the valves.

2. Background Art

Flow control valves are typically arranged for regulating the flow of various gases or liquids over selected ranges of flow conditions and fluid pressures and temperatures. With many types of control valves, it is preferred to arrange the flow passages through those valves to minimize disruptions or significant turbulence of those fluids which are passing through the valves. Generally, little consideration is given to the nature of the fluids which are to be regulated by a particular flow control valve unless those fluids are corrosive (e.g., an acid or a strong caustic) or the fluids are abrasive (e.g., a slurry of particulates such as carbon black or coal). It will, of course, be appreciated that these fluids are readily accommodated either by fabricating critical components of the control valves from appropriate plastics, ceramics or metals or by protecting the exposed surfaces of these components with suitable materials.

Heretofore there has been only a limited demand for flow control valves for specialized fluids such as gaseous oxygen at elevated temperatures and pressures. As a result, those skilled in the art will appreciate that prior-art control valves are generally not suited for such specialized fluids. Therefore, it was not until the advent of rocket propulsion systems that utilize gaseous bipropellants that the critical problems associated with these gaseous bipropellants were even considered much less adequately addressed.

In particular, it has been found that where a fluid such as gaseous oxygen at high pressure and elevated temperatures is to be controlled, the valve must be carefully designed to minimize the risk of violent combustion of the gases passing through the valve. For instance, where a given flow control valve has a tortuous flow passage, there is a serious risk that particulates entrained in gaseous oxygen flowing at high velocities through the valve may be spontaneously ignited by the impact of the particulates against flat surfaces or corners in the flow passage. Moreover, it has also been found that the risk of combustion of components of such valves is significantly increased by the presence of a few extremely-small contaminant particles of metal or the like in a high-velocity stream of gaseous oxygen flowing through a valve having a flow passage with only a minor change of direction or a portion that represents a modest transition zone. It will be appreciated, therefore, that these problems will be even greater in a multi-port control valve where the gaseous bipropellant is to be diverted from one outlet port of the control valve to another outlet port of the valve.

Tests have shown, for example, that when even a small number of metal particles which are no larger than 2,000-$\mu$m (0.079-inch) in diameter are inadvertently being transported in a high-velocity stream of oxygen, the impact of those particles against opposing surfaces in the flow passages in conventional control valves can promote the combustion of the materials of the valve bodies and the other components of the fluid system. Thus, since it is impossible to completely eliminate the presence of such minute particles in the flow lines and propellant tanks, it is essential that every component in the fluid system be designed to minimize as far as possible the risk that the impact of one or more of these particles against an opposing surface in the flow passages in these valves will cause a violent combustion of the particles as well as the various components which are exposed to the propellant fluid.

OBJECTS OF THE INVENTION

Accordingly, it is an object of the present invention to provide new and improved valves for controlling fluids at high pressures and elevated temperatures as well as fluids being used for cryogenic applications.

It is a further object of the invention to provide new and improved multi-outlet control valves for fluids such as high-pressure gaseous oxygen at elevated temperatures and abrasive fluids which are arranged for selectively directing the fluids to the outlet ports of the valve without creating objectionable backpressure surges in the fluid system as well as maintaining a relatively-constant fluid velocity through the control valve as it is being actuated.

It is yet another object of the invention to provide new and improved valves for metering the flow of high-pressure gaseous oxygen at elevated temperatures so as to reduce the risks that particulate materials transported by the flowing gas night ignite as the gas passes through these valves.

SUMMARY OF THE INVENTION

These and other objects of the invention are attained by a control valve having a body with a fluid inlet on one side and spaced primary and secondary outlets on the opposite side of the valve body. The new and improved valve of the present invention further includes a rotatable valve member mounted in an elongated bore defining a central cavity in the valve body between the fluid inlet and outlets. The valve member includes a transverse flow passage having a unique configuration for selectively communicating the fluid inlet with the dual outlets while minimizing undesirable pressure changes in the fluid system and maintaining the velocity of the fluids relatively constant while the valve member is being rotated to an alternate operating position. The new and improved valve of the invention further includes upper and lower seal members cooperatively arranged around the rotatable valve member above and below the transverse flow passage for sealing the valve member in relation to the valve body but without imposing significant frictional restraint to the rotation of the valve member to its respective operating positions. By arranging the valve so that the upper and lower seal members will be preferably sealed on equal-diameter portions of the valve member there will be little or no unbalanced axial forces on the valve member which might otherwise impair the rapid rotation of the valve member between its operating positions.

BRIEF DESCRIPTION OF THE DRAWINGS

The several features of the invention are set forth with particularity in the appended claims. The arrangement and practice of the invention, together with further objects and various advantages thereof, may best be understood by way of the following description of an exemplary apparatus which incorporates the principles of the invention as illustrated in the accompanying drawings, in which:

DETAILED DESCRIPTION OF THE PREFERRED EMBODIMENT

Figure 1:
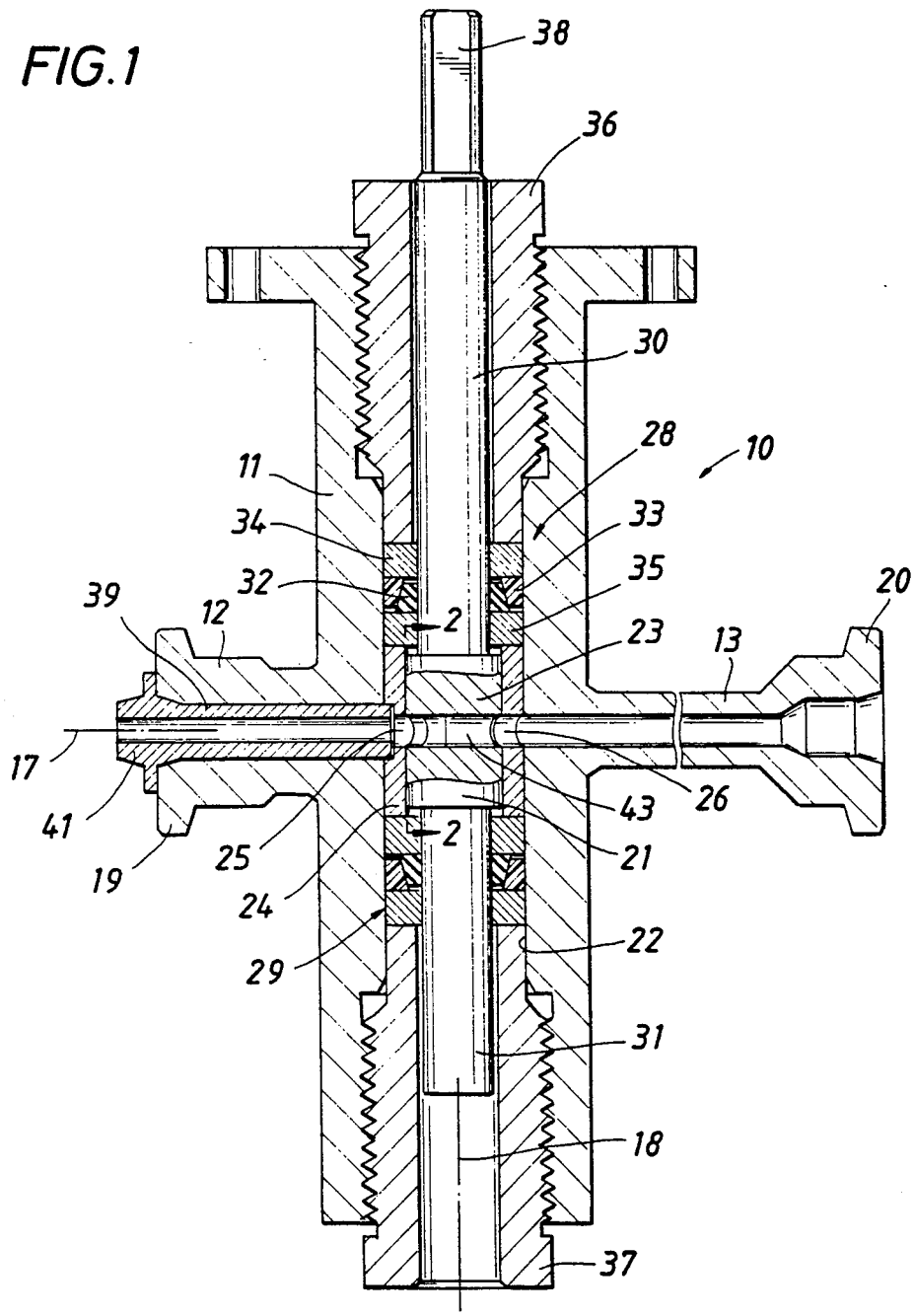
FIG. 1 is a cross-sectioned elevational view showing a preferred embodiment of a flow control valve incorporating the principles of the invention as the valve will appear when it is in an upright position.
Figure 2:
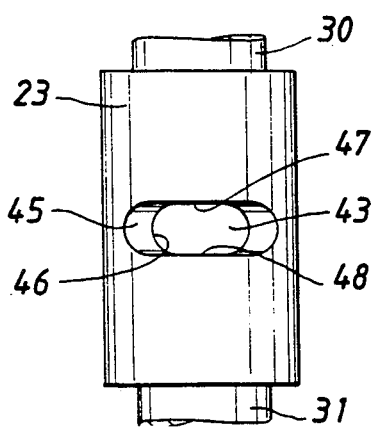
FIG. 2 is an elevational view taken along the Line "2—2"in FIG. 1 showing the central portion of a preferred embodiment of a unique valve member employed in the new and improved flow control valve depicted in FIG. 1.
Figure 3:
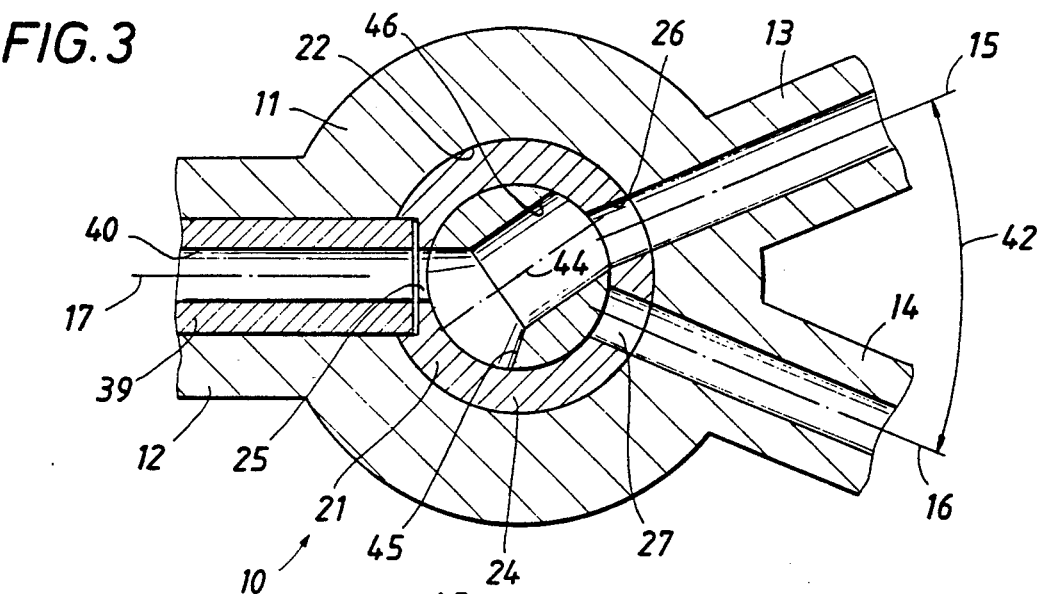
FIG. 3 is a somewhat-schematic plan view of the new and improved control valve of the invention while the valve member is in a first operating position for selectively directing all of the fluids flowing through the valve to the primary fluid outlet of the flow control valve.

Turning now to FIGS. 1-3, a preferred embodiment of a new and improved flow control valve 10 incorporating the principles of the invention is depicted in an upright position and comprising a body 11 having a fluid inlet 12 projecting laterally outwardly from one side of the valve body and primary and secondary outlets 13 and 14 projecting laterally outwardly from the opposite side of the valve body. Since the illustrated valve 10 is to be utilized for controlling propellant fluids such as gaseous oxygen at high pressure and elevated temperatures, the valve is fabricated from metals which are capable of operating under such severe conditions. Accordingly, the valve body 11 as well as the fluid inlet 12 and the outlets 13 and 14 are preferably arranged as thick-walled tubular members respectively formed of monel or one or more selected stainless steels which are cooperatively assembled by appropriate welding techniques. It will, of course, be appreciated that in keeping with the objects of the invention, the specific materials and the particular fabrication techniques will be selected in accordance with the proposed application and particular operating conditions for the new and improved flow control valve 10 of the invention.

As best illustrated in FIG. 3, the dual outlet fittings 13 and 14 are respectively directed along longitudinal axes 15 and 16 which are symmetrically disposed on opposite sides of the extended longitudinal axis 17 of the inlet fitting 12 and are diverging outwardly in relation to one another from the common junction of the three longitudinal axes with the central axis 18 of the valve body 11. As will subsequently be described in detail, the fittings 12-14 are preferably arranged on the valve body 11 so that the longitudinal axes 15-17 of the fittings are respectively lying in a common transverse plane perpendicularly intersecting the central axis 18 of the upright valve body. As shown, for example, at 19 and 20 in FIG. 1, the new and improved control valve 10 further includes coupling means such as enlarged-diameter flanges which are respectively arranged on the outer ends of the inlet and outlet fittings 12-14 for connecting the valve into a particular propellant system (not illustrated in the drawings). It will, of course, be appreciated that the angle of divergence between the dual outlet fittings as well as the specific dimensions and configuration of the fluid fittings 12-14 must be in accord with the requirements of the particular propellant system in which the control valve 10 is to be installed.

As depicted in FIG. 1, an elongated cylindrical valve member 21 is mounted in a central chamber in the tubular body 11 which, in the preferred embodiment of the control valve 10, is defined by the axial bore 22 extending through the upright valve body. The valve member 21 is disposed in the axial bore 22 between the inlet and outlet fittings 1214 and arranged for rotation around the central axis 18 of the upright valve body.

In the preferred embodiment of the control valve 10, the valve member 21 includes an enlarged-diameter mid-portion 23 which is complementally fitted in a short tubular liner or sleeve 24 disposed in the intermediate portion of the axial bore 22 of the valve body 11 between the inlet and outlet fittings 12-14. As best seen in FIG. 3, circular lateral ports 25-27 are cooperatively arranged around the mid-portion of the liner sleeve 24 so as to be coincidentally aligned with the longitudinal bores of the inlet and outlet fittings 12-14 respectively, with these ports preferably having the same internal diameter as the tubular fittings so as to minimize the obstruction to the flow of fluids through the control valve 10 which might otherwise occur if there were significant differences in their respective diameters. It should also be noted that in keeping with the objects of the invention, particular attention is given in designing the inlet and outlet fittings 12-14 and the ports 25-27 so as to keep the velocity of the fluids flowing through the control valve 10 as constant as possible as well as to minimize the pressure drop through the valve. Accordingly, the longitudinal bores in the fittings 12-14 and the ports 25-27 may be appropriately shaped and sized as required for a particular application.

As indicated generally at 28 and 29 in FIG. 1, in the depicted preferred embodiment of the control valve 10, upper and lower seal assemblies are cooperatively arranged around the upper and lower end portions 30 and 31 of the valve member 21 and respectively disposed in the axial bore 22 immediately adjacent to the upper and lower ends of the sleeve member 24 for preventing the leakage of high-pressure fluids through the small annular clearance spaces between the valve body 11 and the end portions of the valve member. Each of the seal assemblies 28 and 29 includes a matched set of inner and outer frustoconical seal rings, as at 32 and 33, preferably formed of a deformable metal such as a copper alloy that is suited for the extreme operating conditions of the valve 10. As illustrated in FIG. 1, the frustoconical inner and outer seal rings 32 and 33 define tapered opposing end surfaces which are cooperatively sized and arranged to enable each set of the annular rings to be complementally interfitted together in the axial bore 22 of the valve body 11 with their respective mating surfaces sealingly engaged with one another.

Each of the seal assemblies 28 and 29 further includes a pair of flat annular backup members, as at 34 and 35, which are respectively engaged with the adjacent flat surfaces on the opposite ends of their associated seal rings 32 and 33. The backup members 34 and 35 are cooperatively arranged in the axial bore 22 of the valve body 11 at opposite ends of the sleeve member 24 so that the backup members immediately adjacent to the sleeve member are respectively engaged with its upper and lower end surfaces. As best seen in FIG. 1, the interfitting seal rings 32 and 33 in each of the seal assemblies 28 and 29 are disposed in the axial bore 22 so as be cooperatively engaged between the opposing flat faces of their respectively associated pair of annular backup members 34 and 35.

To urge the seal rings 32 and 33 into sealing engagement with one another, the upper and lower seal assemblies 28 and 29 further include externally-threaded packing nuts 36 and 37 that are respectively disposed around the upper and lower end portions 30 and 31 of the valve member 21 and threadedly engaged with complemental internal threads at each end of the axial bore 22 in the valve body 11. Accordingly, when the new and improved control valve 10 is being assembled, the advancement of the externally-threaded packing nuts 36 and 37 along their respective internal threads in the axial bore 22 will be effective for compressing the interfitting frustoconical seal rings 32 and 33 in the upper and lower seal assemblies 28 and 29 between their respective annular backup members 34 and 35. The axially-directed forces which are thereby imposed on the deformable seal rings 32 and 33 will, of course, cooperatively develop a wedging action between the interfitting tapered surfaces on the seal rings in the upper and lower seal assemblies 28 and 29 for closing the minute annular spaces defined between the upper and lower end portions 30 and 31 of the valve member and the valve body 11.

Accordingly, it will be recognized that in addition to sealingly engaging the seal rings 32 and 33 with each other, the tightening action of the upper and lower packing nuts 36 and 37 will be effective for expanding the inwardly-facing interior edges of the upper and lower inner seal rings 32 outwardly into sealing engagement around the adjacent peripheral surfaces of the upper and lower end portions 30 and 31 of the valve member 21. In a similar fashion, tightening of the packing nuts 36 and 37 will expand the outwardly-facing exterior edge surfaces of the outer seal rings 33 in the upper and lower seal assemblies 28 and 29 radially outwardly into sealing engagement with the adjacent wall surfaces of the axial bore 22 in the valve body 11.

In keeping with the objects of the invention, it should be particularly noted that the interaction between the inner and outer frustoconical seal rings 32 and 33 will enable the packing nuts 36 and 37 to be selectively adjusted only as needed for maintaining an effective seal around the upper and lower end portions 30 and 31 of the valve member 21 but without unduly restraining its turning movements. By virtue of the minimum frictional restraint imposed on the valve member 21 by the upper and lower sealing assemblies 28 and 29, it has been found that the new and improved control valve 10 can be operated with a minimum of torque being necessary to move the valve member to its respective operating positions.

Although the particular type of actuating means which may be employed for operating the control valve 10 is outside of the scope of the invention, as indicated generally at 38 the upper end portion 30 of the valve member 21 is appropriately shaped to facilitate coupling the valve member to a suitable valve-actuating device which can develop the minimal torque required to turn the valve member 21 between its operating positions. This reduced torque requirement will, of course, allow the valve member 21 to be rotated quickly as well as provide greater control for accurately positioning the valve member.

It will, of course, be appreciated that the control valve 10 may be successfully operated either manually or by using an actuator which is capable of selectively operating the valve in accordance with the requirements of a particular fluid-handling system or test facility. For instance, without departing from the scope of the present invention, the valve member 21 may be rotated between its primary and secondary positions without halting at its intermediate operating position depicted in FIG. 4 or the valve member may be momentarily halted at that position. Alternatively, the valve member 21 may also be sequentially advanced to selected incremental operating positions between its primary and secondary positions. The particular type of valve actuator as well as the operating speed of these rotational movements will, of course, depend entirely upon the specific requirements for a given fluid system.

In the preferred embodiment of the flow control valve 10 of the invention, an elongated tubular orifice member 39 is coaxially mounted in the inlet fitting 12 so as to align the precisely-machined axial bore 40 of the orifice with the longitudinal axis 17 of the inlet fitting. As best seen in FIG. 3, to position the orifice member 39 in the inlet fitting 12, the forward end of the orifice is disposed in a counterbore formed in the outer end of the entrance port 25 in the sleeve member 24 and an enlarged rearward end portion 41 of the orifice is disposed in a complementary counterbore in the outer face of the inlet flange 19. By making the diameter of the axial bore 40 of the orifice 39 equal to the diameter of the port 25 in the sleeve 24, there will, of course, be little or no interference to the fluids passing from the orifice into the entrance port.

Figure 4:
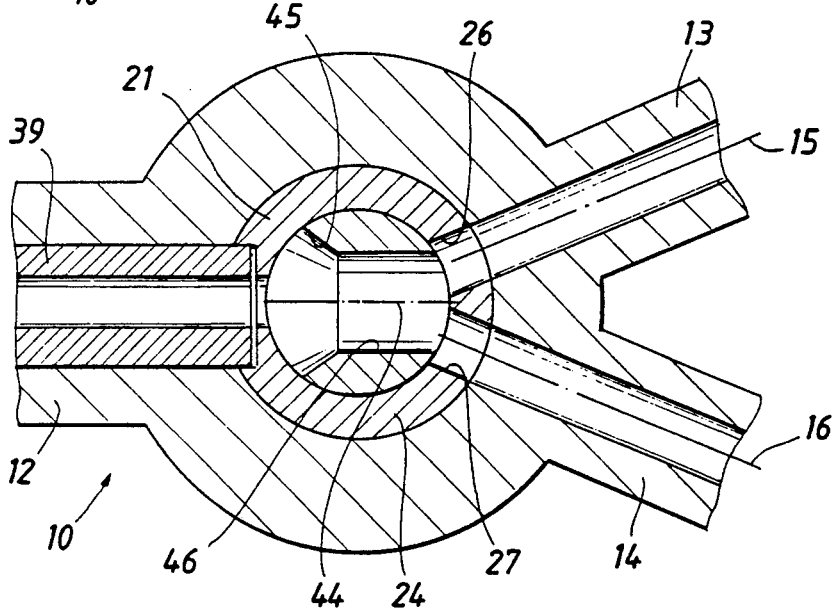
FIG. 4 is another somewhat-schematic cross-sectioned view similar to FIG. 3 but depicts a second operating position of the valve member for selectively dividing fluids flowing through the control valve between the primary and secondary fluid outlets of the control valve.
Figure 5:
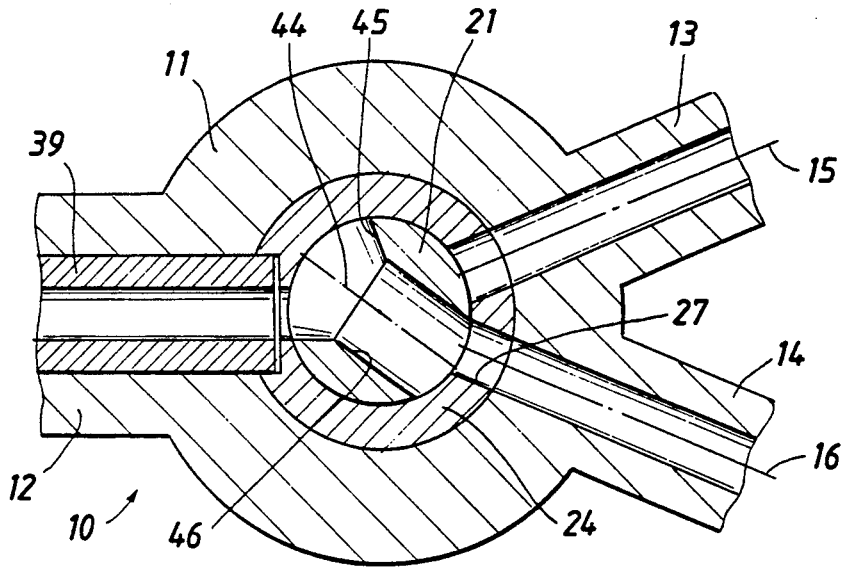
FIG. 5 is similar to FIG. 4 but illustrates the valve member after it has been moved to a third operating position for selectively directing all of the fluids flowing through the control valve of the invention to the secondary fluid outlet of the valve.

As illustrated in the drawings, the valve member 21 is cooperatively mounted in the valve body 11 to be selectively turned in a predetermined arc 42 which spans the primary operating position of the control valve 10 shown in FIG. 3 and the secondary operating position of the valve seen in FIG. 5. In accordance with the objects of the invention, a transverse passage 43 having a unique oblong cross-section is arranged in the enlarged-diameter mid-portion 23 of the valve member 21 to extend along a longitudinal passage axis 44 that is perpendicular to the central axis 18 of the valve body 11 and lies in a transverse plane of rotation including the longitudinal axes 17-19 of the inlet and outlet fittings 12-14. As shown in FIGS. 3-4, the oblong flow passage 43 is uniquely arranged to define a forward portion 45 which has forwardly-converging side walls uniformly disposed on opposite sides of the passage axis 44 and a rearward portion 46 having parallel side walls uniformly disposed on opposite sides of the passage axis. As best illustrated in FIG. 2, the oblong flow passage 43 also defines parallel upper and lower surfaces 47 and 48 which are spatially disposed above and below the transverse plane including the longitudinal axes 17-19 of the inlet and outlet fittings 12-14. In keeping with the principles of the invention, the vertical spacing between the upper and lower planar surfaces 47 and 48 of the passage 43 is equal to the diameter of the lateral ports 25-27 in the sleeve 24 to avoid rearwardly-facing surfaces around the ports that would otherwise impede the free movement of fluids into the dual outlets 13 and 14.

As best seen by comparing FIGS. 3 and 5, the converging forward portion 45 of the flow passage 43 is cooperatively arranged so that the upstream port 25 in the sleeve 24 will always be entirely uncovered in any angular orientation of the valve member 21 within the bounds of the arc 42. To achieve this, the converging inlet portion 45 is uniquely shaped for defining an elongated oblong entrance opening on the upstream side of the valve member 21 which is uniformly disposed on each side of the longitudinal axis 44 of the flow passage 43 and extends transversely along an arc having an included angle at least equal to the angle of the arc 42. The semi-circular side walls of the inlet passage portion 45 are diverged uniformly toward the central axis 18 of the valve member 21 from the outward edges of the elongated arcuate entrance opening to the respective junctions of the diverging side walls with the semi-circular side walls in the outlet portion 46 of the flow passage 43. By virtue of this unique oblong configuration of the flow passage 43, it will be appreciated that its convergent inlet portion 45 defines a symmetrical transition zone enabling fluids to enter the transverse flow passage with minimum disturbance.

In keeping with the principles of the invention, it will be further noted that the rearward portion 46 of the passage 43 is uniquely formed for defining an elongated or oblong opening on the downstream side of the valve member 21 which is uniformly disposed on each side of the passage axis 44. As illustrated in FIG. 4, by virtue of the unique oblong cross-sectional configuration of the flow passage 43, while the valve member 21 is being moved between its primary and secondary operating positions respectively shown in FIGS. 3 and 5, fluids will be temporarily directed into both of the outlet fittings 13 and 14 so that there will be little or no significant interruption in the flow of the fluids. To accomplish this, as best seen in FIG. 4, the flow passage 43 is cooperatively formed so that the downstream opening of the passage will straddle the two outlet ports 26 and 27 in the sleeve 24 while the valve member 21 is being turned for selectively redirecting flow from one to the other of the dual outlet fittings 13 and 14.

Accordingly, it will be appreciated that as the control valve 10 is operated to position the valve member 21 in its primary operating position depicted in FIG. 3, the fluids will be able to enter the converging entrance opening 45 without encountering opposing surfaces that would otherwise create unwanted turbulence as these fluids enter the fluid passage 43. In a similar fashion, as fluids pass through the passage outlet 46 and enter the sleeve port 26, the fluids will encounter only minimal opposition as represented by a small rearwardly-facing exposed surface of the interior wall of the sleeve 24 between the adjacent outward edges of the oblong outlet passage and the port. It should be noted, however, that this small exposed wall portion of the sleeve 24 is curved toward the port 26 so that the fluids will be guided toward the sleeve port without encountering abrupt wall surfaces that might promote spontaneous combustion of the particles entrained in the fluids impacting this exposed wall portion.

As previously noted, by virtue of the unique configuration of the outlet passage portion 46, there is never a complete blockage of flow through the control valve 10 whenever the valve member 21 is being turned from between its primary and secondary operating positions respectively shown in FIG. 3 and FIG. 5. From FIG. 4 it will be apparent that the intervening portion of the sleeve 24 lying between the two outlet ports 26 and 27 represents an opposing wedge-shaped wall surface which only moderately obstructs the fluids exiting from the transverse passage 43. Nevertheless, in keeping with the principles of the invention, the outlet ports 26 and 27 are closely spaced to reduce the size of the opposing wall surface and significantly minimize the risk of particle impact ignitions occurring whenever gaseous oxygen or other hazardous fluids are flowing through the new and improved control valve. This small, wedge-shaped wall surface will also be effective for directing the fluids passing through the ports 26 and 27 into the dual outlets 13 and 14 with a minimum of disruption to the fluid flow. As a result, it will be appreciated that there will be no more than minimal variations in the backpressure of the fluids upstream of the control valve 10 of the invention whenever the valve member 21 is being moved between its primary and secondary operating positions.

When the valve member 30 is positioned in the secondary operating position depicted in FIG. 5, fluids entering the valve 10 will again enter the converging passage entrance 45 without encountering opposing surfaces. Then, as the fluids move on through the outlet portion 46 of the flow passage 43 and enter the sleeve port 27, the fluids will encounter only minimal opposition as represented by the exposed internal wall surface of the sleeve 24 immediately outside of the semi-circular outward edge of the oblong exit of the outlet passage. Hereagain, this small wall surface of the sleeve 24 is inclined toward the sleeve port 27 to facilitate the movement of the fluids in that direction.

Accordingly, in keeping with the objects of the present invention, it will be recognized that the new and improved control valve 10 disclosed herein is uniquely arranged for controlling the flow of fluids such as gaseous oxygen at high pressures and elevated temperatures as well as fluids in various cryogenic applications. By virtue of the unique configuration of the transverse flow passage 43 in the valve member 21, fluids may be selectively directed to one or the other of the outlets 13 and 14 of the valve 10 without creating objectionable backpressure surges in the fluid system while the control valve is being actuated. Moreover, the unique design of the transverse flow passage 43 reduces the risks that particulate materials transported by a stream of gaseous oxygen might ignite the particles passing through the new and improved fluid control valve 10 of the present invention.

It will be further appreciated that the close sliding fit between the sleeve 24 and the mid-portion 23 of the valve member 21 significantly reduces the amount of leakage around the ports 25-27 so that the upper and lower seal assemblies 28 and 29 may be carefully adjusted for effectively sealing around the end portions 30 and 31 of the valve member while imposing only a minimum frictional force to be overcome for turning the valve member between its operating positions. In this manner, the effectiveness of the two seal assemblies 28 and 29 will greatly reduce the torque requirements for an actuator to operate the new and improved control valve 10 of the present invention.

While only a particular embodiment of the apparatus of the present invention has been shown and described herein, it is apparent that various changes and modifications may be made without departing from the principles of the present invention in broader aspects; and, therefore, the aim in the claims appended hereto is to cover all such changes and modifications as fall within the true spirit and scope of this invention.

What is claimed is:

1. A high-temperature, high-pressure metering valve comprising:

a tubular valve body having an axial bore extending therethrough, an intermediate portion of said bore having an inlet and first and second outlet passages extending there into, the outlet passages being angularly opposed to said inlet passage, all three passages having longitudinal axes which lie in a transverse plane perpendicular to the axis of the axial bore;

a cylindrical sleeve mounted in the intermediate portion of said axial bore having ports aligned with the longitudinal bores of the inlet and outlet passages;

an elongated cylindrical valve member cooperatively mounted in said cylindrical sleeve having an enlarged diameter mid-portion having a transverse passage with an oblong cross section alignable with the inlet passage and one or more of the outlet passages, one end of the valve member provided with means to facilitate rotation of the valve member around the center axis of the axial bore; and sealing means adjacent each end of the cylindrical sleeve establishing a seal around the cylindrical valve member and with the axial bore; said sealing means include first and second annular backup members, the first annular backup members contacting an end of the cylindrical sleeve, first and second frustoconical seals interfitted with one another and disposed between said first and second annular backup members, and externally threaded annular members, each annular member cooperatively arranged with an end portion of the valve body for compressing said frustoconical seals between said first and second annular backup members thereby expanding said frustoconical seals into sealing engagement.

2. The valve set forth in claim 1 wherein the oblong cross section of the transverse package is so proportional that smooth and uninterrupted flow through the valve is assured whereby flow rates are not disrupted and pressure drops are not created.

3. The valve set forth in claim 1 wherein there is an elongated tubular orifice member coaxially mounted in the inlet passage and extending into the inlet port of the cylindrical sleeve thereby precisely aligned the cylindrical sleeve with the inlet and outlet passages.

4. A high-temperature, high-pressure metering valve comprising:

a tubular valve body having an axial bore extending therethrough, an intermediate portion of said bore having an inlet passage and first and second outlet passages extending there into, the outlet passages being angularly opposed to said inlet passage, all three passages having longitudinal axes which lie in a transverse plane perpendicular to the axis of the axial bore;

a cylindrical sleeve mounted in the intermediate portion of said axial bore having ports aligned with the longitudinal bores of the inlet and outlet passages;

an elongated tubular orifice member coaxially mounted in the inlet passage and extending into the inlet port of the cylindrical sleeve thereby precisely aligning the cylindrical sleeve with the inlet and outlet passages;

an elongated cylindrical valve member cooperatively mounted in said cylindrical sleeve having an enlarged diameter midportion having a transverse passage with an oblong cross section alignable with the inlet passage and one or more of the outlet passages, one end of the valve member provided with means to facilitate rotation of the valve member around the central axis of the axial bore; and sealing means adjacent each end of the cylindrical sleeve establishing a seal around the cylindrical valve member and with the axial bore; said sealing means include first and second annular backup members, the first annular backup members contacting an end of the cylindrical sleeve, first and second frustoconical seals interfitted with one another and disposed between said first and second annular backup members, and externally threaded annular members, each annular member cooperatively arranged with an end portion of the valve body for compressing said frustoconical seals between said backup members thereby expanding said frustoconical seals into sealing engagement.

5. The valve set forth in claim 4 wherein the oblong cross section of the transverse passage is so proportional that smooth and uninterrupted flow through the valve is assured whereby flow rates are not disrupted and pressure drops are not created.

6. A high-temperature, high-pressure metering valve comprising:

a tubular valve body having an axial bore extending therethrough, an intermediate portion of said bore having an inlet passage and first and second outlet passages extending there into, the outlet passages being annularly opposed to said inlet passage, all three passages having longitudinal axes which lie in a transverse plane perpendicular to the axis of the axial bore;

a cylindrical sleeve mounted in the intermediate portion of said axial bore having ports aligned with the longitudinal bores of the inlet and outlet passages;

an elongated cylindrical valve member cooperatively mounted in said cylindrical sleeve having an enlarged diameter midportion having a transverse passage with an oblong cross section alignable with the inlet passage and one or more of the outlet passages, one end of the valve member provided with means to facilitate rotation of the valve member around the central axis of the axial bore; and means adjacent each end of the cylindrical sleeve establishing a seal around the cylindrical valve member and with the axial bore said sealing means include first and second annular backup members, the first annular backup members contacting an end of the cylindrical sleeve, first and second frustoconical seals interfitted with one another and disposed between said first and second annular backup members, and externally threaded annular members, each annular member cooperatively arranged with the end portion of the valve body for compressing said frustoconical seals between said backup members thereby expanding said frustoconical seals into sealing engagement.

* * * * *